United States Patent [19]

Funayama

[11] 3,972,623
[45] Aug. 3, 1976

[54] LASER REFERENCE DEVICE

[75] Inventor: Yoshiaki Funayama, Yokohama, Japan

[73] Assignee: Nihon Zemu Co., Ltd., Tokyo, Japan

[22] Filed: Oct. 18, 1974

[21] Appl. No.: 515,863

[30] Foreign Application Priority Data
Sept. 6, 1974  Japan................................ 49-101948

[52] U.S. Cl................................ 356/172; 356/152
[51] Int. Cl.²......................................... G01B 11/26
[58] Field of Search............................. 356/138, 172

[56] References Cited
UNITED STATES PATENTS

| | | | |
|---|---|---|---|
| 3,012,469 | 12/1961 | Clayborne............................ | 356/172 |
| 3,582,215 | 6/1971 | Cornillault........................... | 356/138 |
| 3,813,171 | 5/1974 | Teach et al.......................... | 356/172 |
| 3,819,273 | 6/1974 | Unema et al. ..................... | 356/172 X |
| 3,846,026 | 11/1974 | Waters.............................. | 356/172 X |

Primary Examiner—Robert Segal
Attorney, Agent, or Firm—Jones, Thomas & Askew

[57] ABSTRACT

The laser reference device consisting of a beam sender which radiates a laser beam and a beam receiver which receives a laser beam radiated from the beam sender and issues a signal in accordance with the position whereat a laser beam is received, the beam receiver being mounted, for example, on a working equipment on a working lorry to detect a vertical or horizontal deviation of the working equipment from a laser beam by means of the beam receiver so that it is allowed to work while tracing a laser beam by such a control as to correct the vertical or horizontal deviation of the working equipment in accordance with the signal transmitted from the beam receiver.

1 Claim, 10 Drawing Figures

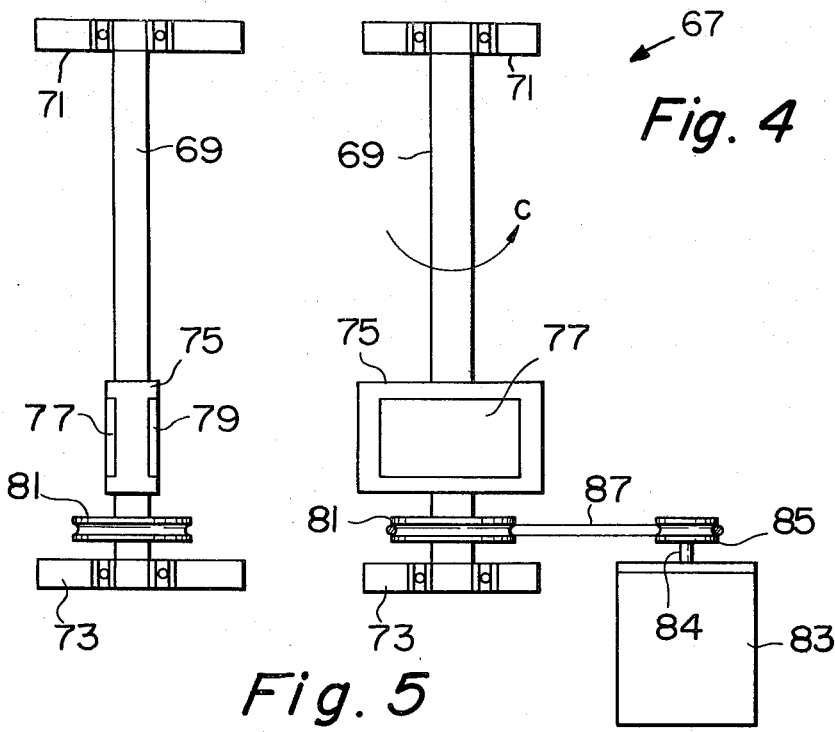
Fig. 4
Fig. 5
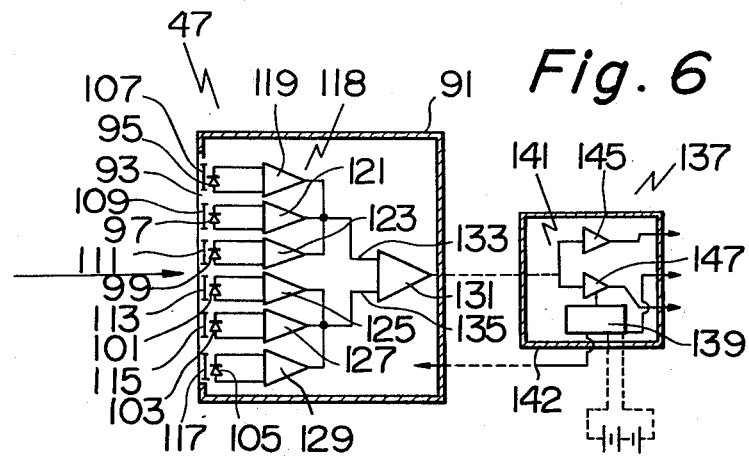
Fig. 6
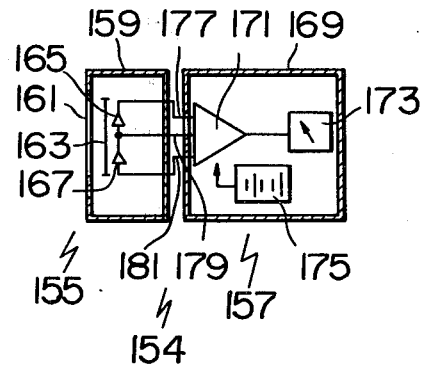
Fig. 7

LASER REFERENCE DEVICE

DETAILED DESCRIPTION

The present invention relates to a reference device which is used in road construction, water channel construction, opening-up of a land, and the like, and which makes use of a laser beam.

For example, in construction works of roads and the like, conventionally, piles are driven along construction positions and a piano wire or a nylon rope stretched between these piles to use them as the reference of longitudinal slope (that is, the grade in the longitudinal direction of a road, which is referred to as grade hereinafter), steering or the like. This example and features of the present invention will be better understood upon consideration of the following description on the case of the paving construction of a roadway by means of an asphalt finisher, and the accompanying drawings in which:

FIG. 4 is a schematic diagram of the scanner;

FIG. 5 is a schematic diagram of the beam receiver;

FIG. 6 is a schematic diagram of the driving device;

FIG. 7 is a schematic diagram of the monitor device;

Figure 1:
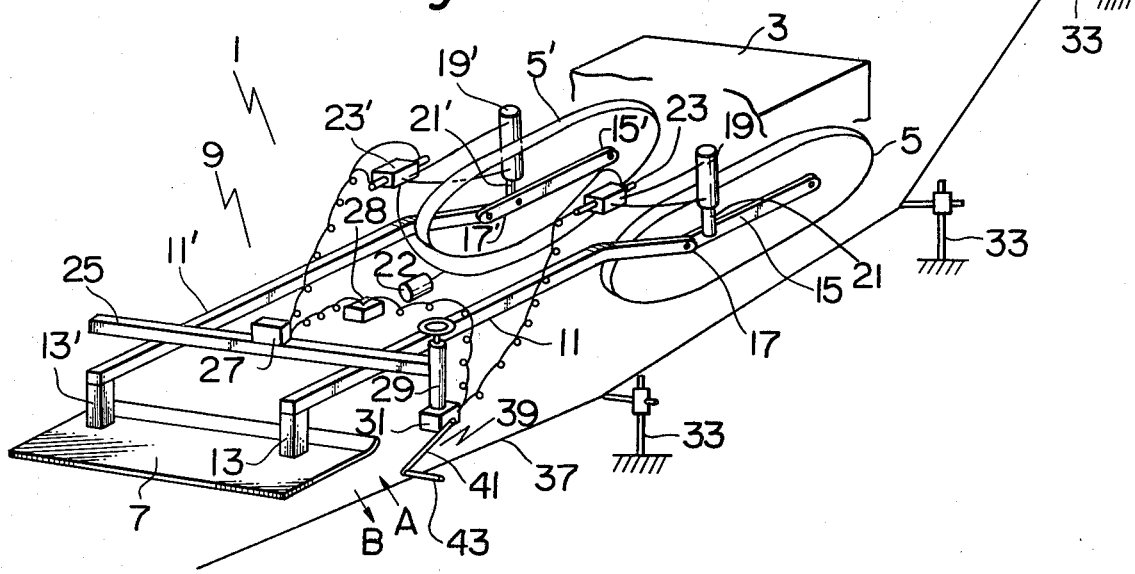
FIG. 1 is a schematic diagram of the road pavement according to the conventional technique.

With reference now to the drawings and particularly to FIG. 1 thereof illustrating the outline of the pavement construction by means of an asphalt finisher, there is shown a known asphalt finisher by 1, the carrosserie thereof by 3, driving crawlers by 5 and 5', screed to level off asphalt mixture is provided, though the illustration thereof is omitted. If the screed adjuster 9, 11 and 11' are screed adjusting members, screed supporting members 13 and 13' are hung down at the rear ends of the screed adjusting members 11 and 11', and the lower ends of the screed supporting members 13 and 13' are respectively fixed on the upper surfaces of both the end sections of the aforesaid screed 7. On the other hand, the front ends of the screed adjusting members 11 and 11' are pivotably coupled with the rear ends of pivot members 15 and 15' and the front ends of the pivot members 15 and 15' are pivotably mounted on the carrosserie 3, so that the coupling sections 17 and 17' of the screed adjusting members and the pivot members are pivotable in the vertical direction. 19 and 19' are the hydraulic cylinders for adjusting the screed, and the ends of the rods 21 and 21' of the hydraulic cylinders 19 and 19' are respectively coupled with the rear end sections of the pivot members 15 and 15'. The vertical operation of the rods 21 and 21' is controlled by the electromagnetic valves 23 and 23' which control the operation of the hydraulic cylinders by changing over the oil stream from a hydraulic pump 22. 25 is a cross beam which is laid on the screed adjusting members 11 and 11', and a slope detector 27 to detect the slope of the screed 7 in the lateral direction of a road is placed on the cross beam 25. The slope detector 27 is supplied with power from the power source 28, and if the slope of the screed 7 is deviated from a predetermined value, a signal in accordance with the deviation is issued. By this signal, the electromagnetic valve 23' is changed over and driven and the hydraulic cylinder 19' is operated so as to restore the slope of the screed to a predetermined value.

In addition to this, a grade detector 31 to detect the height of the screed 7 above the longitudinal slope reference line (grade line) is mounted at the end of the supporter 29 which is mounted at an end of the cross beam 25. 33 designates a pile driven along the side of a road, and 37 is the reference line of the longitudinal slope (grade) which is set by stretching a piano wire, a nylon rope or the like. 39 represents the detecting piece of the grade detector 31 which consists of a rod 41 which is pivotable around a supporting axis and a contact member 43 which is hung in the horizontal direction at the end of the rod, and the contact member 43 slides while keeping contact with the upper surface or the lower surface of the reference line 37. If the screed 7 is vertically deviated from a predetermined height with respect to the reference line 37, the detecting piece 39 of the grade detector will pivot in the direction indicated by the arrow head $a$ or $b$, and the grade detector 31 will issue a signal in accordance with this deviation. By this signal, the electromagnetic valve 23 is driven and the hydraulic cylinder 19 is operated so as to restore the screed 7 to a predetermined value with respect to the reference line 37. In the construction as described above, the asphalt finisher 1 is driven by the crawlers 5 and 5' to advance at an appropriate speed, and molten asphalt mixture is continuously fed from the front of the screed 7 by an asphalt feeder whereof illustration is omitted. The fed molten asphalt mixture is leveled off by the screed 7 and pavement is continuously made, though the heights above the slope of the screed 7 and the reference line 37 vary from predetermined values not only because the crawlers 5 and 5' moving on an unpaved road vertically move along the unevenness on the road but also due to the change in characteristics of the fed asphalt mixture. Now, for example, if the carrosserie 3 rises so that the screed 7 is deviated from a predetermined height with respect to the reference line 37, then the grade detector 31 will also move upwards in accompaniment with this and the detecting piece 39 will pivot in the direction of the arrow head $b$ around the supporting axis thereof. The grade detector 31 will issue a signal in accordance with this pivoting motion, the electromagnetic valve 23 will be changed over by this signal and the rod 21 of the hydraulic cylinder 19 will be driven upwards. If the rod 21 is driven upwards, then the coupling section 17, namely, the end of the screed adjusting member 11 will be lifted, so that the inclination (attack angle) of the screed 7 in the longitudinal direction of the carrosserie in the right section of the figure will increase. As a result of it, the screed 7 which slides while floating on the molten asphalt mixture on the lower surface thereof decreases, and will lower with respect to the reference line 37. On the contrary, if the carrosserie 3 lowers and the screed 7 lowers below a predetermined height with respect to the reference line 37, then the grade detector 31 will also lower and the detecting piece 39 will pivot in the direction of the arrow head $a$. As a result of it, a signal will be transmitted in accordance with the pivoting motion from the grade detector 31 as described above, the electromagnetic valve 23 will be changed over and the rod 21 of the hydraulic cylinder 19 will be driven downwards. If the rod 21 is driven downwards, then the end of the screed adjusting member 11 will lower and the inclination of the screed in the vertical direction of the carrosserie will decrease. As a result of it, the area in contact with the molten asphalt mixture on the lower surface of the screed 7 will increase, and the screed 7 will rise upwards. Thus, the right end section of the screed 7 is held at a constant height with respect to the reference line 37. In addition to this, if the inclination of the carrosserie 3 in the lateral direction varies and the slope of the screed 7 is deviated from a predetermined value, then this deviation will be detected by the slope detector 27 which is placed on the cross beam 25. Now, if the left end section of the screed 7 in the figure sinks downwards, for example, and the slope of the screed 7 is deviated from a predetermined value, then a signal will be issued in accordance with this deviation from the slope detector 27, the electromagnetic valve 23' will be changed over by this signal, and the rod 21' of the hydraulic cylinder 19' will be driven downwards. If the rod 21' lowers, then the end of the screed adjusting member 11' will be pressed downwards, and as a result of it, the left end section of the screed 7 will rise due to the reason as described above. On the contrary, if the left end section of the screed rises, then the rod 21' of the hydraulic cylinder 19' will be driven upwards by the signal from the slope detector 27, and the end of the screed adjusting member 11' will be lifted upwards, so that the left end of the screed 7 will sink due to the reason as described above and will be restored to a predetermined value. As described above, the right end section of the screed 7 is held at a predetermined height with respect to the reference line 37 by the operation of the grade detector 31, and on the other hand, the left end section of the screed 7 is held at the height having a predetermined slope, so that comparatively even pavement can be made in accordance with a predetermined grade and a predetermined slope in spite of the vertical motion of the carrosserie and the variation of the inclination thereof or the change in the characteristics of the molten asphalt mixture and the like. In order to stretch a reference line to be used as a reference, however, piles should be driven at a required interval (in a curve or the like, the interval between piles should be close so as to make a reference line follow the curve), a piano wire, a nylon rope or the like should be installed on these piles, and the installation height at each pile should be adjusted while viewing, for example, an instrument, so accurate installation has been very troublesome. In addition to this, as exceedingly high accuracies has been required for the grade or slope of a road and the evenness of a road not only in runways of an airport but also in high way roads in particular in accompaniment with the increase of the speed of automobiles in recent years, the installation accuracy of a reference line, a slack of a reference wire between piles, and the like has come into a serious question, and there have been such difficulties that, for example, in order to suppress an error due to a slack within a required limit, it has been required to apply a great tensile strength according to the interval between piles and pull both ends of a reference line with exceedingly great force, and so forth. An object of the present invention is to solve such problems of the conventional technique to offer a laser reference device which uses a laser beam as a reference line.

The laser reference device according to the present invention consists of a beam sender which radiates a laser beam to be used as a reference and a beam receiver which is mounted, for example, on a working equipment on a working lorry and controls the working equipment while receiving the laser beam sent from the beam sender, the laser beam radiated from the beam sender being scanned within an appropriate range. An embodiment according to the present invention will be described below in details.

Figure 2:
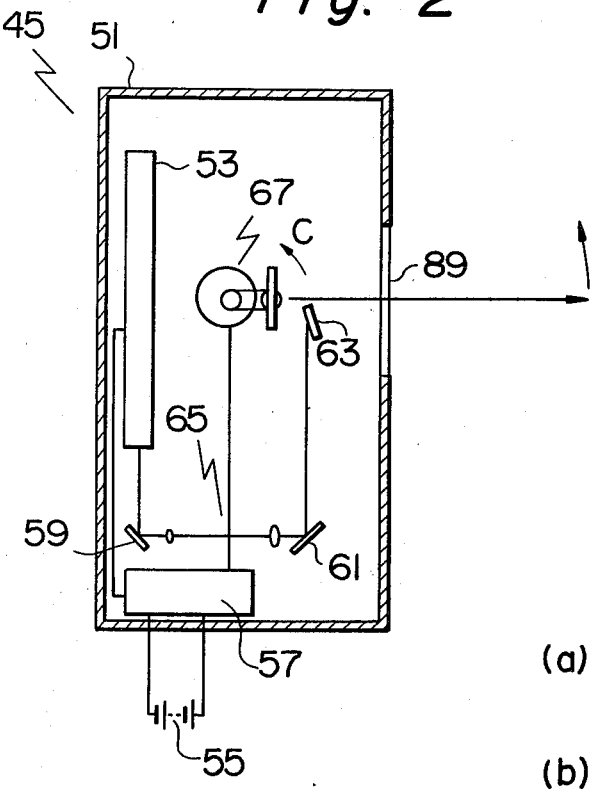
FIG. 2 is a schematic diagram of the beam sender according to the present invention.
Figure 3:
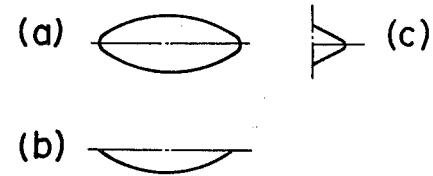
FIG. 3 is a schematic diagram of the sectional view of a laser beam and the intensity distribution of a beam.

In FIG. 2 where the construction of the beam sender 45 is illustrated, 51 is a casing and a position adjusting base (whereof illustration is omitted) is provided under the casing 51 to allow the height, gate and the like of the beam sender 45 to be adjusted. 53 is the laser beam source, for example, of He-Ne gas laser or the like, 55 is the power source for driving the beam sender, and as such, usually a battery for automobile (D.C. 12 V) is used. 57 is a power source equipment, which consists of the power source section for laser to drive the laser beam source and the power source section for motor to drive the motor for revolving the mirror for scanning a beam to be described later. In the power source section for laser, the voltage D.C. 12 V of the power source 55 is boosted up to approximately D.C. 3500 V, for example, when He-Ne gas laser is used. In the power source section for motor, on the other hand, the voltage is transformed, for example, from D.C. 12 V to approximately A.C. 100 V. 59, 61 and 63 are reflectors for turning the direction of a laser beam, and 65 represents an optical system for enlarging and having a laser beam and bettering the parallelism of a beam. The laser beam radiated from the laser beam source 53 is reflected by the reflector 59 and led to an optical system 65. The section of the laser beam led to the optical system is shaved, as shown in FIG. 3 (a), into an elliptic shape having a long axis in the horizontal direction, and the parallelism of the beam is improved. The intensity distribution of the light in the section of a laser beam has such a distribution form having a sharp peak in the central section, that the intensity in the central section is high, as shown in FIG. 3 (b), and it gradually lowers as it approaches both the peripheral sections along the direction of the long axis, while the intensity is high in the central section, as shown in FIG. 3 (c) and it quickly lowers as it approaches both the peripheral sections along the direction of the short axis. The laser beam enlarged and shaved in the optical system 65 is reflected by the reflectors 61 and 63 and led to the scanner 67. In FIG. 4, where the details of the scanner are illustrated, 69 is a revolving axis whereof upper end and lower end are rotatably supported by the bearings 71 and 73, and it is preferable to increase the length of the revolving axis 69 so far as possible in order to reduce the deflection of the radiated laser beam in the vertical direction due to the play in the bearings 71 and 73 so far as possible. 75 is a mirror holder which is fixed on the revolving axis 69, 77 and 79 are mirrors which are held on both surfaces of the mirror holder 75, and 81 is a pulley which is mounted on the revolving axis 69. 83 is a motor which is driven by the power supply equipment 57, and 85 is a pulley which is mounted on the output axis 84 of the motor 83, a belt 87 being hung on the pulley 81 and the pulley 85, so that the mirrors 77 and 79 are revolved, for example, in the direction of the arrow head c by the revolution of the motor 83. The laser beam led by the beam scanner 67, being reflected by the revolving mirrors 77 and 79, is radiated out of the window 89 which is provided in the casing 51, and scanned in the direction of the arrow head c. In FIG. 5, a beam receiver is represented by 47, 91 is a casing which is rigidly formed of iron plates or the like, and 93 is a beam receiving window, for example, in a shape of a slit in the vertical direction, which is provided in the casing, an appropriate number of senser elements for sensing a laser beam being appropriately arranged along the beam receiving window 93. In this embodiment, photo-diodes are used as senser elements, and six photo-diodes 95, . . . , 105 are arranged in a line. In front of the photo-diodes 95, . . . , 105, interference filters 107, . . . , 117 which pass only a laser beam are provided in order to prevent erroneous operation due to the external light. When, for example, He-Ne gas laser is used as the laser beam source 53 of the beam sender 41, filters for 6328 A are used. The output of the photo-diodes is led to a signal generator 118 which is so constructed as to issue different output signals according to which senser element a laser beam encounters. The signal generator 118 consists, in the present embodiment, of pre-amplifiers having the band of approximately 100 ± 20 kHz and an amplifier of differential type 131. That is, the terminals of the photo-diodes 95, . . . , 105 are respectively connected to pre-amplifiers and amplified up to an appropriate voltage. The outputs of the pre-amplifiers 119, 121 and 123 are connected to the input terminal 133 of the amplifier 131, while the outputs of the pre-amplifiers 125, 127 and 129 are connected to the other input terminal 135 of the amplifier 131, and the output of the amplifier 131 varies according to which of the upper half of the arrangement of the aforesaid photo-diodes, that is, the photo-diodes 95, 97 and 99 a laser beam encounters and which of the lower half, that is, the photo-diodes 101, 103 and 105 a laser beam encounters. (For example, when a laser beam encounters the photo-diode 95, 97 or 99, the output voltage of the amplifier 131 is positive, while, when a laser beam encounters the photo-diode 101, 103 or 105, the output voltage of the amplifier is negative.) The output of the signal generator 118 is connected, for example, to a driving device 137 as shown in FIG. 6. In the driving device 137, a power source equipment 139 and a driving section 141 are contained in a casing 142. The power source equipment 139 is connected, for example, to a battery or the like provided in a working lorry, and it is used to transform the voltage D.C. 12 V of a battery, for example, into ± D.C. 15 V to supply the aforesaid beam receiver 47, the driving section 141 and the like with power. The driving section 141 consists of two semi-conductor switches 145 and 147, and both the input terminals of the semi-conductor switches 145 and 147 are connected to the output terminal of the amplifier 131 of the signal generator 118, so that either of the semi-conductor switches 145 and 147 selectively turns into the state of continuity according to the state of the output of the amplifier 131. (For example, when the output of the amplifier 131 is positive, the semi-conductor switch 145 turns into the state of continuity, while, when the output of the amplifier 131 is negative, the semi-conductor switch 147 turns into the state of continuity.) The output terminal of the driving section 141 is connected, for example, to the motor for adjusting the height of a working equipment and the like, the solenoid of the electromagnetic valve of a hydraulic equipment, or the like.

According to the construction as described above, when the laser beam radiated from the beam sender 45 encounters either of the upper half three (the photo-diodes 95, 97 and 99) of the arrangement of the photo-diodes of the beam receiver 47, the output of the amplifier 131 of the signal generator 118 becomes positive so that the semi-conductor switch 145 of the driving section 141 turns into the state of continuity, while, when it encounters any of the lower half three (the photo-diodes 101, 103 and 105), the output of the amplifier 131 becomes negative so that the semi-conductor switch 147 turns into the state of continuity. Hence, the motor, electromagnetic valve and the like which are connected to the output terminals of the driving section 141 can be controlled according to which of the upper half three of the arrangement of the photo-diodes a laser beam encounters or which of the lower half three a laser beam encounters. Therefore, it is allowed to work while automatically correcting the height of a working equipment so that a laser beam may always crosses the midway between the photo-diode 99 and the photo-diode 101 of the beam receiver by mounting the beam receiver 47 on a working equipment on a working lorry and connecting it so as to drive the motor, hydraulic equipment and the like to lift the working equipment when a laser beam encounters any of the upper half three of the arrangement of the photo-diodes of the beam receiver 47 (when the working equipment lowers below the laser beam) and so as to drive them to lower the working equipment when the laser beam encounters any of the lower half three (when the working equipment rises above the laser beam). Thus, it is allowed to work with excellent accuracy at a predetermined grade given by the laser beam by setting the inclination of the laser beam radiated from the beam sender 41, for example, so as to give the predetermined grade and working while tracing this laser beam by means of the beam receiver 47 mounted on the working equipment.

There is shown, in addition, a monitor device 154 which is provided independently of the beam receiver 47 in order to confirm the location of a laser beam (the laser beam is invisible because it is scanned at a high speed), adjust the inclination and the like of the laser beam radiated from the beam sender 45, adjust the set position of the beam receiver 47 mounted on a working equipment, and so forth, and in the beam receiving section 155 consisting of a beam receiving section 155 and an indicating section 157, 159 is a casing provided with a stand and a fine adjusting equipment (whereof illustration is omitted) in the vertical direction in the upper section thereof, and 161 is a beam receiving window provided in the casing, an appropriate number of senser elements being arranged in an appropriate form along the beam receiving window 161. In the present embodiment, two photo-diodes 165 and 167 are used as senser elements. In addition to this, 163 is an interference filter for preventing erroneous operation, which is provided in front of the photo-diodes. The output of the photo-diodes are connected to the indicating section 157. In the indicating section 157, 169 is a casing. An amplifer 171 which is used as a signal generator to issue a signal in accordance with the senser element which receives a laser beam, an indicator, for example, of a meter or the like which is driven by the output of the amplifier 171, and a power source 175 to supply the amplifier 171 with power are contained in the casing 169. The cathode terminal of the photo-diode 167 is connected to the input terminal of the amplifier 171 while the anode terminal of the photo-diode 167 to the input terminal 181. The anode terminal of the photo-diode 165 and the cathode terminal of the photo-didoe 167 are connected to the input terminal 179. Thus, the output of the amplifier 171 turns, for example, to positive/negative according to which of the photo-diode 165 and the photo-diode 167 a laser beam encounters. As the state of the output of the amplifier is indicated on the indicator 173, the position of a laser beam can be known through the indication of the indicator 173. In addition to this, the position (height) of a laser beam can be accurately known by adjusting the height of the beam receiver 155 so that a laser beam may be in the midway between the photo-diodes 165 and 167, while supervising the indication of the indicator 173. Further, the inclination and the like of a laser beam can be accurately set by installing a monitor equipment at a position apart from the beam sender, setting the height of the beam receiving section thereof 155 to a required value, and adjusting the height, gate and like of the beam sender 45 so that the laser beam radiated from the beam sender 45 may pass through the midway between the photo-diodes 165 and 167 of the beam receiver 155.

Figure 8:
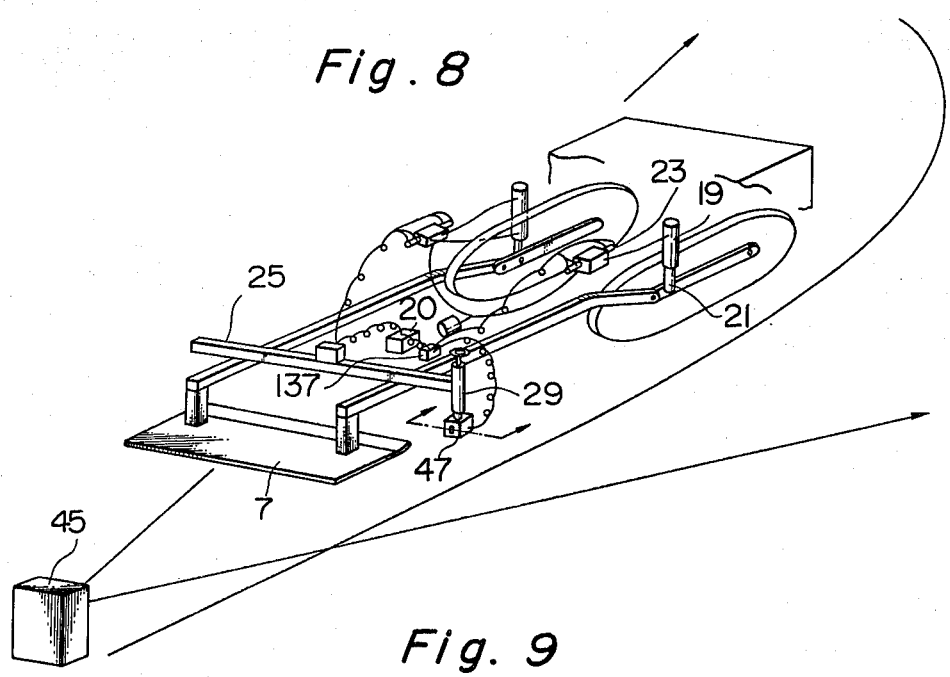
FIG. 8 is a schematic diagram of the road pavement by means of the laser reference device according to the present invention.
Figure 9:
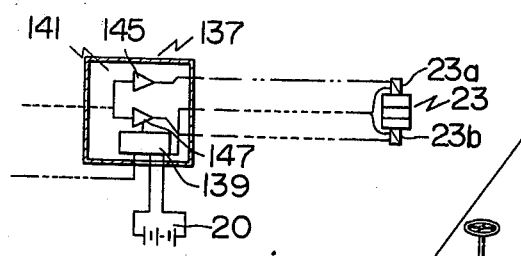
FIG. 9 is a schematic diagram illustrating the wiring thereof.

Then, the following description will concern the case where, for example, an asphalt finisher is equipped with the laser reference device according to the present invention. FIG. 8 is a schematic diagram of the paving work by means of the laser reference device according to the present invention, where the beam sender 45 is installed at an appropriate position in a construction site (for example, at the rear position of an asphalt finisher). On the other hand, the beam receiver 47 is mounted at the lower end of a supporter 29 which is mounted at an end of the cross beam 25, and it is mounted with its back forwards so that it can receive the laser beam sent from the rear of the carrosserie 3. The driving device 137 is mounted at an appropriate position in the carrosserie 3, and the power source equipment 139 to supply the beam receiver 47 and the driving section 141 with power is connected to the battery 20 of the asphalt finisher. Besides, the output of the driving section 141 is connected to the electromagnetic valve 23. That is to say, one of two terminals respectively of the solenoids 23a and 23b of the electromagnetic valve 23 is connected to the power source equipment 139, while the other terminal is connected to the semi-conductor switch 145 and the semi-conductor switch 147 respectively, and when a laser beam encounters any of the upper half three (the photo-diodes 95, 97 and 99) of the photo-diodes of the beam receiver 47, the rod 21 of the hydraulic cylinder 19 is driven downwards, while, when a laser beam encounters any of the lower half three (the photo-diodes 101, 103 and 105), the rod 21 of the hydraulic cylinder 19 is driven upwards.

To carry out paving work, in the construction as described above, the inclination of the laser beam radiated from the beam sender 45 is adjusted so as to give a predetermined grade by adjusting the adjusting base whereof illustration is omitted, which is provided in the lower section of the casing 51 of the beam sender 45, and the direction of scanning is adjusted so that the beam receiver 47 may not be got out of the scanning range of the laser beam. Then, the difference of heights between the screed 7 and the beam receiver 47 is adjusted by operating the supporter 29, and when the beam receiver 47 is at such a height that the laser beam crosses just between the photo-diodes 99 and 101, the screed 7 is set so as to be at a predetermined height above the road. (The thickness of pavement is set hereby.) After the preparations as described above have been completed, paving work is commenced. If the screen 7 vertically deviates from the laser beam during work, the beam receiver 47 will move vertically in accordance with this. Now, for example, when the screed 7 deviates upwards from the laser beam, the laser beam encounters any of the lower half three of the photo-diodes of the beam receiver. Then, the semi-conductor switch 147 turns into the state of continuity in accordance with the signal transmitted from the photo-diodes, the current flows to the solenoid 23b to change over the electromagnetic valve 23, and the rod 21 of the hydraulic cylinder 19 is driven upwards to sink the screed downwards. On the contrary, when the screed 7 deviates downwards from the laser beam, the laser beam encounters any of the upper half three of the photo-diodes of the beam receiver. Then, the semi-conductor switch 145 turns into the state of continuity in accordance with the signal transmitted from the photo-diodes, the current flows to the solenoid 23a to change over the electromagnetic valve 23, and the rod 21 of the hydraulic cylinder 19 is driven downwards to raise the screed 7 upwards. Accordingly, exceedingly even pavement can be made at the predetermined grade give by the laser beam, because paving work can be carried out while maintaining the height of the beam receiver 47 at such a height that the laser beam crosses just between the photo-diodes 99 and 101.

As described above, the laser reference device according to the present invention consists of a beam sencer which radiates a laser beam and a beam receiver which receives the laser beam radiated from the beam sender and issues a signal in accordance with the beam receiving position of the laser beam, the beam receiving being mounted on a working equipment on a working lorry in order to allow to work while tracing the laser beam by detecting the vertical deviation of the working equipment from the laser beam by means of the beam receiver and controlling so as to correct the deviation of the height of the working equipment in accordance with the signal transmitted from the beam receiver. In particular, because a laser beam is used as a reference line in the present invention, the present invention features the following as compared with the conventional technique wherein a piano wire, a nylon rope or the like is stretched between piles to set a reference line:

1. The trouble of driving numbers of piles along construction positions to adjust the installation height at each pile one by one can be eliminated;
2. Because such errors as an installation error in each pile, a slack between piles, and the like can be entinguished, it is allowed to work with exceedingly high accuracy as compared with the conventional technique;
3. Because everything is constituted of a semi-conductor and there is no mechanically movable section in the beam receiver, this is so durable against the vibration of the working lorry; and so forth.

Further, because the laser beam radiated from the beam sender is scanned according to the present invention, only one beam sender suffices even for the case where the working lorry curves along working positions, the case such as opening-up of a land where a large area is to be readjusted, and the like, so long as the scanning range is appropriately adjusted.

In addition to this, the kind, the number and the arrangement form of the senser elements provided in the beam receiver as well as the construction of the signal generator and the like can be appropriately changed, so that a working equipment can be appropriately controlled, for example, by allowing different signals to be issued in accordance not only with the direction (for example, the vertical direction) of the deviation of the laser beam from the set position but also with the scale of the deviation, or by providing an insensible zone not to allow signals to be issued while the deviation from the set position remains within a certain limit.

Figure 10:
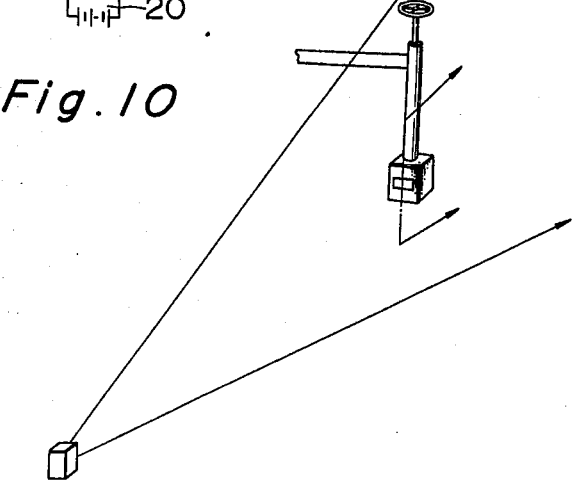
FIG. 10 is a schematic diagram of another embodiment according to the present invention.

As shown in FIG. 10, further, if the device is so constructed that the laser beam radiated from the beam sender is scanned in the vertical direction while the senser elements of the beam receiver are arranged in the horizontal direction to detect the deviation in the horizontal direction from the set position of the laser beam so that the signal is issued in accordance with this deviation, then it can be used as the reference device of the steering of a working lorry. Furthermore, both the grade and the steering can be controlled at the same time by using a beam sender to scan the laser beam in the horizontal direction and a beam sender to scan the laser beam in the vertical direction at the same time and equipping the working lorry with a beam receiver to detect the vertical deviation from the laser beam scanned in the horizontal direction and a beam receiver to detect the horizontal deviation from the laser beam scanned in the vertical direction.

I claim:

1. In combination, a beam sender 45 including a laser beam source 53 for radiating a laser beam and a scanner 67 for scanning the laser beam radiated from said laser beam source, said scanner 67 including a mirror holder 75 and mirrors 77, 79 held on opposite surfaces of said mirror holder rotatably supported in the path of the laser beam by a pair of space bearings 71, 73 and rotatable about an axis 69 with said bearings being spaced apart from each other as far as possible for reducing the deflection of the radiated laser beam from a plane normal to said axis due to the play in the bearing, a working lorry, a screed 7 towed by said working lorry, a pair of screed adjusting arms 11, 11' each connected at one of their ends to said screed, said working lorry including means 19, 19' for raising and lowering the other ends of said adjusting arms to increase or decrease the incline of said screed, a cross beam 25 mounted on and extending across said adjusting arms, a beam receiver 47 mounted at one end of said cross beams to detect the height of the screed above or below the radiated laser beam, said beam receiver 47 including sensor elements 95–103 for receiving and sensing the laser beam radiated from the aforesaid beam sender 45, and a signal generator 118 responsive to the signals from the said sensor elements and which transmit the signal in accordance with the sensor element receiving the laser beam, a monitor device 154 provided independently of the beam receiver 47 comprising a receiving section 155 and an indicating section 157, said receiving section 155 including at least two photo-diodes 165, 167, said photo-diodes being connected to said indicating section 157 so that the laser beam radiated from the beam sender 45 may pass midway between the photo-diodes 165 and 167 of the beam receiver 155.

* * * * *